2 Sheets—Sheet 1.

M. GREGG.
CORN-PLANTER.

No. 185,915. Patented Jan. 2, 1877.

ATTEST:
Robert Burns.
L. Blond Burdett

INVENTOR:
Marshall Gregg
By Knight & Co.
his attorneys

N. PETERS, PHOTO-LITHOGRAPHER, WASHINGTON, D. C.

2 Sheets—Sheet 2.

M. GREGG.
CORN-PLANTER.

No. 185,915. Patented Jan. 2, 1877.

ATTEST:
Robert Burns.
Le Blond Burdett.

INVENTOR:
Marshall Gregg
By Knight Bros
his attys

UNITED STATES PATENT OFFICE.

MARSHALL GREGG, OF CHAMOIS, MISSOURI.

IMPROVEMENT IN CORN-PLANTERS.

Specification forming part of Letters Patent No. 185,915, dated January 2, 1877; application filed April 28, 1876.

*To all whom it may concern:*

Be it known that I, MARSHALL GREGG, of Chamois, Osage county, State of Missouri, have invented certain new and useful Improvements in Corn-Planters, of which the following is a full, clear, and exact description, reference being had to the accompanying drawings, making part of this specification.

The first part of my improvement consists in the combination of a clutch on the driving-axle and an adjustable tappet on the feed-slide, by which the machine may be adjusted to drop at the exact place required by the simple movement of a lever.

The second part of my improvement relates to the combination of the dropping devices with stamps, by which the hills are stamped and marked.

The third part of my invention relates to the devices for giving to the shares, &c., a vertical movement, and combining therewith devices for raising the stamps.

Figure 1:
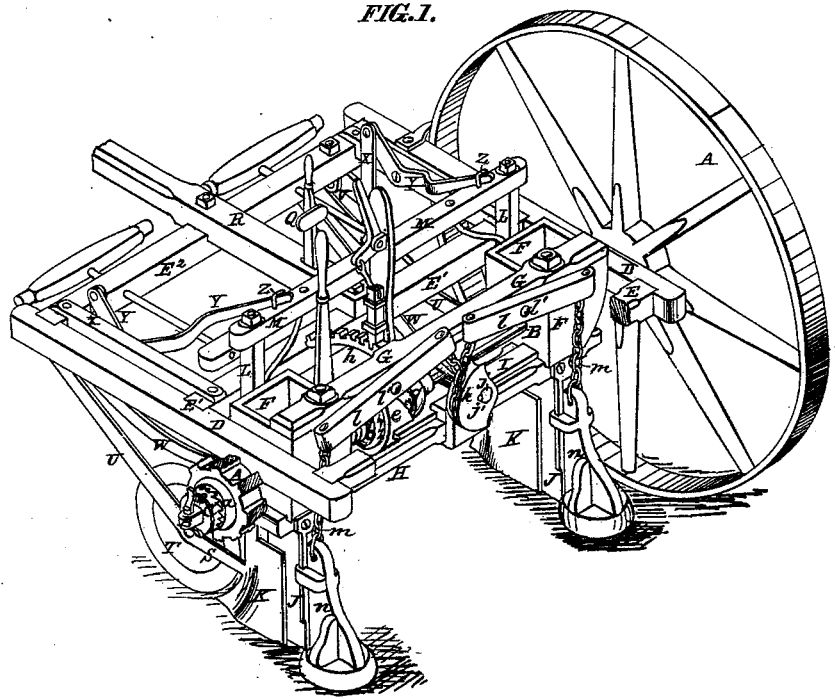
Figure 2:
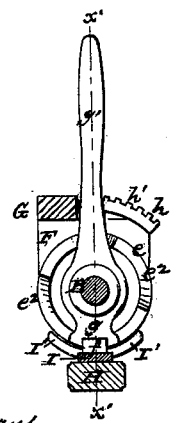
Figure 3:
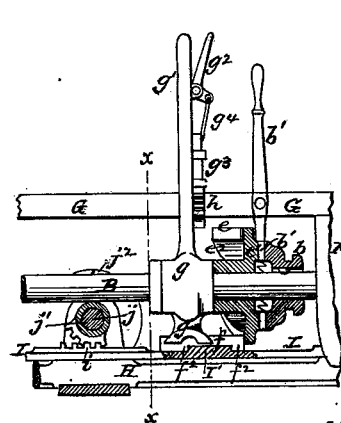
Figure 4:
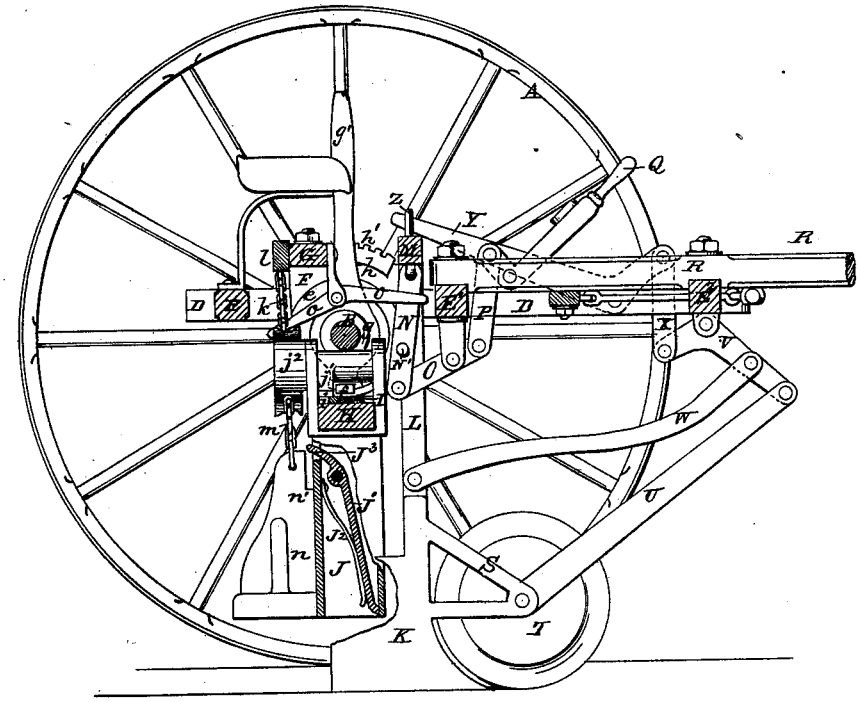
Figure 5:
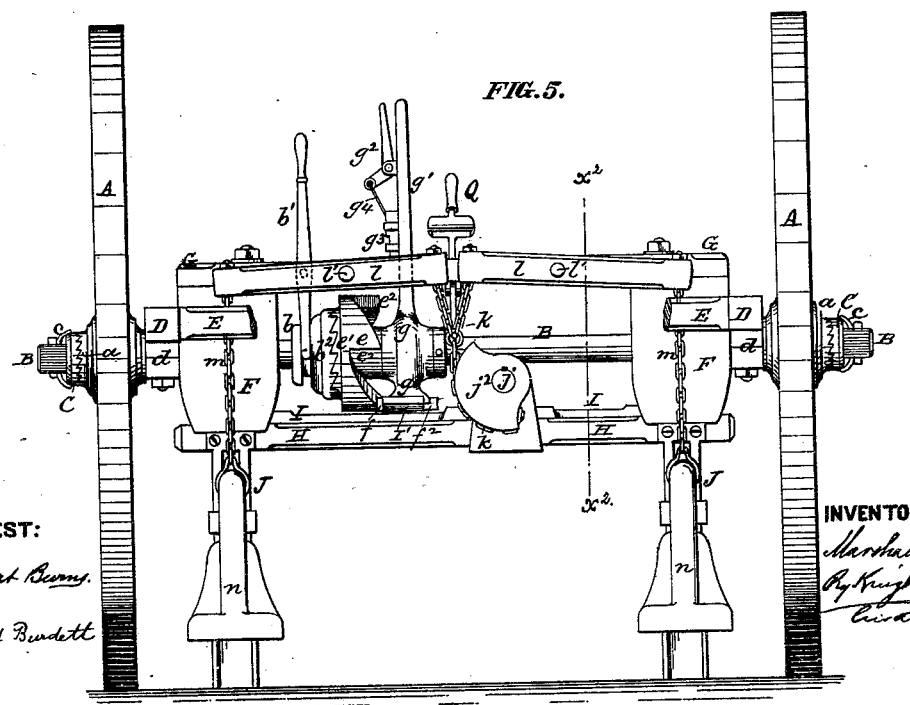

Figure 1 is a perspective view of the machine. Fig. 2 is a detail transverse section at $x\ x$, Fig. 3. Fig. 3 is a detail longitudinal section at $x^1\ x^1$, Fig. 2. Fig. 4 is a longitudinal section at $x^2\ x^2$, Fig. 5. Fig. 5 is a rear elevation.

A A are ground-wheels on an axle-shaft, B. These wheels are capable of turning upon the axle B in a backward direction; but when the wheel is rolling forward upon the ground it carries the axle around with it by means of a spring ratchet-clutch, one member, $a$, of which is formed by the outer end of the hub, and the other member of the clutch is formed on a collar, C, with an angular central orifice fitting an angular part of the axle, so as to be incapable of turning on the axle; but this collar is capable of endwise motion on the axle, and is pressed inward by a spring, $c$, fixed to the end of the axle. The spring $c$ tends to keep the clutch $a$ C engaged; but when the wheel is turned backward the part C of the ratchet is forced outward, so as to disengage the clutch and allow the wheel to turn upon the axle. The axle B turns in boxes $d$ beneath the longitudinal bars D D. The bars D D are connected together by transverse bars E $E^1$ $E^2$. F F are the seed boxes or hoppers, connected together at top by the transverse bar G, and at bottom by a transverse bar, H, on which the seed-slide I has bearing.

No novelty is claimed in the hoppers, or in the parts of the seed-slide within them.

To the lower side of the bar H are attached the hollow standards J, through which the seed falls to the ground, (being arrested in its passage by a spring-plate, J, as hereinafter set forth.) At the front sides of standards J are vertically-movable shares K, which open the furrow for the reception of the seed, the shares being adjusted vertically to open the furrow of the required depth. The shares are raised and lowered by means of a bell-crank lever, Q, fulcrumed in the tongue-bar R, the lever acting through the medium of a link, P, lever O, vertical bar N, transverse bar M, and upright bars L L, which latter are attached to the shares. S is a frame, extending forward from the shares K, and giving journal-bearing to the rotating opener T, which runs before the share and clears a way for the same. U is a draw-bar extending from the fore end of the frame S to the lower end of the lever, the draw-bar having hinge-connection with said frame and lever. W is a bar, hinged to the lever V and the upright L. X is a link connecting the rear end of the lever V to the lever Y, which passes through a staple, Z, upon the bar M.

The described construction and arrangement of bars and levers confines the share and rotary cutter to a vertical movement parallel to the standard J, so that they are always in the same position relative to the front side of said standard, whatever their position vertically thereto may be.

It will be seen that by the movement of the lever Q the share K and rotary opener T are raised and lowered to make the furrow of the required depth, or to raise them from contact with the ground when moving the machine from place to place.

The turning axle or shaft B carries a clutch-collar, $b$, capable of endwise movement on the shaft B by a clutch-lever, $b^1$, to engage its ratchet-face $b^2$ with the similar face $e^1$ of the cam $e$, or to disengage the said ratchet-faces. The cam $e$ turns freely on the shaft B, (except when the clutch $b^2$ $e^1$ is engaged to cause it to turn with the shaft;) but the cam $e$ is incapable of endwise movement upon the shaft B. The cam $e$ carries a number of—say, four—cam-teeth, $e^2$, which work against the inclined end $f^1$ of a sliding plate or slider, $f$, having shoulders $f^2$, engaging a curved plate, I', on the top of the feed-slide I, so that as the plate $f$ is moved by the cams $e^2$ the feed-slide receives motion through medium of the slider $f$. The plate I' is concentric with the axle. The slider $f$ slides in bearings in the head $g$, capable of oscillation on the shaft B as its axis of oscillation. This head has oscillatory movement by means of a lever, $g^1$, having a sliding catch, $g^2$, engaging in the notches $h'$ of a bar, $h$, extending forward from the transverse bar G. The catch is raised, to disengage it from the notches $h'$, by a bell-crank lever, $g^3$, to which it is connected by a rod, $g^4$.

It will be seen that the movement of the seed-slide, as to time, will be governed by the position of the slider as adjusted by the lever $g^1$, so that by the movement of the lever the hills of corn may be made in line with those of the other rows, transversely to the course of the machine.

Upon the top of the seed-slide is a cog-rack, $i$, which engages a cog-sector, $j^1$, upon a shaft, $j$, which also carries a groove-faced sector, $j^2$. To the sector $j^2$ is attached a chain, $k$, which separates into two branches at the upper end, which are attached to the inner ends of levers $l\ l$, fulcrumed at $l'\ l'$ to the bar G. From the outer ends of these levers descend chains $m\ m$, which are attached to the upper ends of the stamps $n\ n$. These stamps are arranged to descend upon the hills after the seed is deposited, and, besides compacting the earth upon the seed, serve to mark the position of the hill.

The stamps $n\ n$, in their upward movement, govern the exact time of the dropping of the seed into the furrow, by moving back the spring seed-plate $J^1$ within the hollow standard J. The seed-plate $J^1$ is held by a spring, $J^2$, in such a position that its lower end arrests the seed in its descent. The upper end of the plate $J^1$ is curved outward at $J^3$, so as to project beyond the rear of the standard J, and to be in the course of the shoulder $n'$ of the stamp, so that when the shoulder $n'$ comes in contact with the end $J^3$, the lower end of the plate $J^1$ is moved back and releases the seed-corn upon it, and allows the same to drop into the furrow. Just after this the slider-plate $f$ is released from one of the cams $e^2$, and the seed-slide is allowed to move backward, which it does by the weight of the stamps acting through the chains $m\ m\ k$, levers $l\ l$, sectors $j^2\ j^1$, and rack $i$.

On the side of the vertical bar N is a lug or pin, N', which, as the bar is raised to a certain height, comes in contact with the forward end of the lever $o$. The lever $o$ has fulcrum-support on bar G, and its rear end engages in the chain $k$, so that as the shares and rotary openers are raised from the ground the chain $k$ will be drawn down, and the stamps drawn up and sustained until the shares are again lowered; and the machine may be moved from place to place.

In relation to the operation of the machine: In starting across the field, at the beginning of each through, it is evident that the dropping would seldom take place at the right time, so that the hills would come in line with those already dropped in the adjoining rows. The dropping is made to take place earlier or later, to accommodate this, by moving the lever $g^1$ respectively backward or forward, so as to bring the tappet or slider $f$ to the required position to cause the corn to drop at the proper place.

As the machine is hung loosely on the axle B it may swing back on said axle sufficiently to avoid damage on striking an immovable obstruction.

The dropper-plates $J^1$ in their motion serve to keep the lower ends of the hollow standards J clear of dirt.

I claim—

1. The combination of clutch $b\ e$ on axle B, and adjustable tappet or slider $f$, substantially as and for the purpose set forth.

2. The combination of the seed-slide I, curved plate I', adjustable tappet $f$, and cam $e$, substantially as and for the purpose set forth.

3. In combination with the curved plate I' and adjustable tappet $f$, the bearing-head $g$ of the latter adapted to oscillate on the axle, and operated by a lever, $g^1$, with catch $g^3$, substantially as and for the purpose set forth.

4. The combination of the seed-slide I, rack $i$, sectors $j^1\ j^2$, chains $k$, levers $l\ l$, chains $m\ m$, and stamps $n\ n$, substantially as set forth.

5. The combination of stamp $n$ and spring-dropper J $J^2$, substantially as set forth.

6. The vertical standards J, shares K, rotary openers T, and lever Q, in combination with the link P, lever O, bars N M L, frame S, draw-bar U, levers V Y, bar W, link X, and staple Z, substantially as and for the purpose set forth.

7. The combination, with the shares K and devices for raising and lowering the same, of the pin N' and lever $o$, connected with the chain $k$, to raise the stamps $n\ n$ simultaneously with the shares when the latter are lifted above the surface of the ground, substantially as set forth.

MARSHALL GREGG.

Witnesses:
SAML. KNIGHT,
ROBERT BURNS.